Oct. 7, 1958 D. R. SALMON 2,855,574
INTERFERENCE SUPPRESSOR UNITS
Filed Sept. 14, 1953
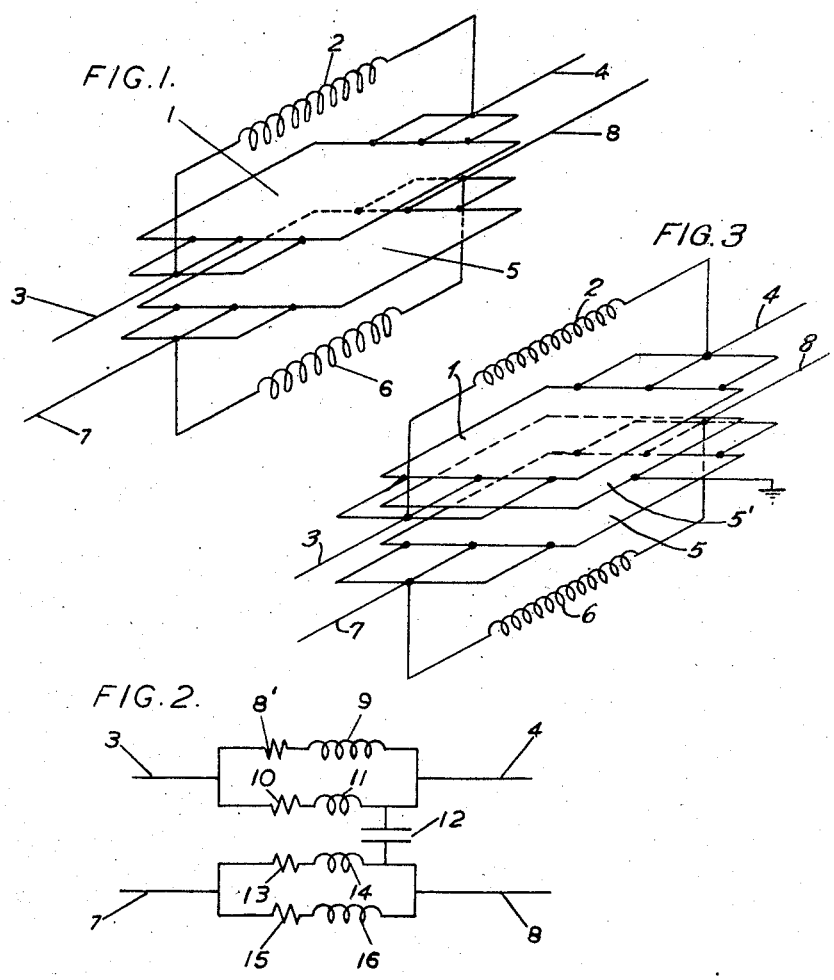
Inventor
D. R. SALMON
By [signature]
Attorney

United States Patent Office 2,855,574
Patented Oct. 7, 1958

2,855,574

INTERFERENCE SUPPRESSOR UNITS

Dennis Roy Salmon, London, England, assignor to International Standard Electric Corporation, New York, N. Y., a corporation of Delaware Application September 14, 1953, Serial No. 380,066

Claims priority, application Great Britain September 16, 1952

2 Claims. (Cl. 333—79)

This invention relates to an interference suppression unit for use in electrical circuits carrying heavy currents where unwanted signals have to be suppressed. These unwanted interference signals are usually in the high frequency range.

In the pending application of D. A. Beresford, Serial No. 334,063, filed January 29, 1953, a construction of a capacitor is described which enables the line current to be passed through the electrodes of the capacitor between the edges of each electrode. This means that the electrodes are actually connected in series in the lines of the circuit, and the impedance between the lines of the circuit due to the capacitor will therefore be almost entirely capacitive. Any resistance or inductive impedance between the lines due to the capacitor will be that caused by the electrodes and the dielectric material themselves and will be very small, and since the inductive reactance of this shunt path between the lines is very small, a good shunt path is offered to the high frequency interfering currents which require suppression.

This method of construction has the disadvantage, however, that the line current of the circuit is required to pass through the electrodes, and the current carrying capacity of the electrodes limits the type of circuit to which this type of capacitor can be applied.

Even the inclusion of conductors in contact with the electrodes across their width does not increase the current carrying capacity sufficiently in some instances.

To overcome this difficulty a shunt, to the line current which passes through the electrode, is provided so that while only a safe value of the line current is allowed to pass through the electrode, all of the high frequency interfering current is caused to pass through the electrode and thence via the shunt path due to the capacitance between the electrodes of the capacitor.

According to the present invention there is provided an interference suppression unit comprising a capacitor so constructed that electrical connection can be made to opposite edges of each electrode of the said capacitor, an inductor connected across the edges of each of the said electrodes, and means for connecting the unit in the circuit in which interference is to be suppressed so that a portion of the line current in said circuit passes through an electrode of the said capacitor, and so that the remainder of the line current passes through the inductor in parallel with the said electrode.

Descriptions of the invention will now be made with reference to the accompanying drawing in which Fig. 1 shows diagrammatically one embodiment, Fig. 2 shows an equivalent circuit diagram of the arrangement shown in Fig. 1, and Fig. 3 shows a modified form.

Referring to Fig. 1, electrode 1 of a capacitor and an inductor 2 shunted across the electrode, are connected in series with conductors 3 and 4 in one line of an electric circuit, and electrode 5 of the same capacitor and an inductor 6 shunted across it are connected in series with conductors 7 and 8 in the other line of the same circuit. The inductors 2 and 6 may be in any suitable form, for example helical or spiral, and for the suppression of frequencies in a restricted range the impedance offered by a flat bar may be quite sufficient.

It may be possible to include the inductor inside the case of the unit, although in general this is not possible since it may have to carry currents of the order of hundreds of amperes, and the cross-sectional area of the conductor necessary for this makes the inductor too large.

Referring to Fig. 2, the resistances 8' and 15, and the inductances 9 and 16 represent the electrical characteristics of the inductors 2 and 6 and their connecting leads. The resistances 10 and 13 and the inductances 11 and 14 represent the electrical characteristics of the electrodes 1 and 5, and their connecting leads. The capacitance 12 represents the capacity between the electrodes 1 and 5. The lines 3 and 7 are the lines of the electric circuit in which high frequency interference currents are present as well as the line current of the circuit. The line current passes to lines 4 and 8, whilst interference currents traverse only the shunt path. By reason of the construction of the capacitor, as described in our above-mentioned pending application, the inductance of the leads appears in series with the lines, and the shunt path offered to the high frequency interference currents, is of very low impedance and the interference currents are thus confined to a local circuit between the interference source and the shunt path. In order to ensure that the interference currents pass round the shunt path 10, 11, 12, 14, 13, it is necessary to ensure that the impedance offered to them by the paths 8', 9 and 15, 16 is very much greater than that offered by the shunt path.

In a similar manner it is also necessary to ensure that the ratio of the impedances of the paths 8', 9 to 10, 11, and 15, 16, to 13, 14 offered to the line current is such that not more than the rated current for the electrode will pass through the paths 10, 11 and 13, 14.

In order to achieve these ratios it may be necessary to include some extra impedance in one of the paths.

Although this description has thus far been made with reference to a two-wire system, the invention may be equally well applied to polyphase systems, and furthermore, although the description is of a balanced system, the invention may be applied to unbalanced systems. One of the electrodes of the capacitor may be connected in one line of a circuit as described, and the other electrode connected to earth. Thus, a unit having three electrodes may be constructed, as shown in Fig. 3, having one electrode 5' connected to earth and the other two connected in the lines of a circuit.

While the principles of the invention have been described above in connection with specific embodiments and particular modifications thereof, it is to be clearly understood that this description is made only by way of example, and not as a limitation on the scope of the invention.

What we claim is:

1. An interference suppression unit, comprising a capacitor having at least two electrodes and so constructed that electrical connection can be made to opposite edges of each electrode, an inductor connected across said opposite edges of each of the said electrodes, and means attached to said opposite edges of each electrode for connecting the unit in the circuit in which interference is to be suppressed, so that a portion of the line current in said circuit passes through each electrode of the said capacitor, and the remainder of the line current passes through the inductor in parallel with the said electrode, whereby the interference currents pass between the electrodes of the capacitor.

2. An interference suppression unit as claimed in claim 1 in which two electrodes are connected in the lines of a circuit and an electrode between the said two electrodes is connected to earth.

References Cited in the file of this patent

UNITED STATES PATENTS

| | | |
|---|---|---|
| 2,027,067 | Schubert | Jan. 7, 1936 |
| 2,180,722 | Rust | Nov. 21, 1939 |

FOREIGN PATENTS

| | | |
|---|---|---|
| 463,111 | Great Britain | Mar. 22, 1937 |
| 106,806 | Australia | Mar. 16, 1939 |